United States Patent [19]

Nguyen et al.

[11] Patent Number: 6,125,312

[45] Date of Patent: Sep. 26, 2000

[54] MAINTENANCE AND WARRANTY CONTROL SYSTEM FOR AIRCRAFT

[75] Inventors: Phuc Luong Nguyen, Brossard; Avrum Goldman, Ville St. Laurent; Peter H. Graham, St. Lambert; R. Ian McCormick, St. Bruno, all of Canada

[73] Assignee: Pratt & Whitney Canada Corp., Longueuil, Canada

[21] Appl. No.: 09/385,362

[22] Filed: Aug. 30, 1999

Related U.S. Application Data

[63] Continuation of application No. 08/893,672, Jul. 11, 1997, Pat. No. 6,003,808.

[51] Int. Cl.$^7$ .......................... G01M 17/00; G06F 19/00; B64C 5/00; G08B 19/00

[52] U.S. Cl. .............................. 701/35; 701/30; 244/1 R; 340/439

[58] Field of Search .............................. 244/1 R; 364/424, 364/424.03, 468; 701/29, 30, 35; 707/103, 104; 340/439

[56] References Cited

U.S. PATENT DOCUMENTS

| | | | |
|---|---|---|---|
| 4,404,641 | 9/1983 | Bozarnik | 364/424 |
| 4,841,456 | 6/1989 | Hogan, Jr. et al. | 702/119 |
| 4,943,919 | 7/1990 | Aslin et al. | 364/424.03 |
| 4,967,337 | 10/1990 | English et al. | 700/79 |
| 4,985,857 | 1/1991 | Bajpai et al. | 702/184 |
| 5,018,069 | 5/1991 | Pettigrew | 701/35 |
| 5,023,791 | 6/1991 | Herzberg et al. | 701/35 |
| 5,081,599 | 1/1992 | Saito | 702/183 |
| 5,111,402 | 5/1992 | Brooks et al. | 701/35 |
| 5,164,912 | 11/1992 | Osborne et al. | 713/300 |
| 5,195,173 | 3/1993 | Gordon et al. | 706/11 |
| 5,208,745 | 5/1993 | Quentin et al. | 700/83 |
| 5,210,704 | 5/1993 | Husseiny | 702/34 |
| 5,214,582 | 5/1993 | Gray | 701/33 |
| 5,216,612 | 6/1993 | Cornett et al. | 364/468 |
| 5,408,412 | 4/1995 | Hogg et al. | |
| 5,445,347 | 8/1995 | Ng | 701/35 |
| 5,453,939 | 9/1995 | Hoffman et al. | 364/424.03 |
| 5,491,631 | 2/1996 | Shirane et al. | 701/35 |
| 5,521,842 | 5/1996 | Yamada | 109/274 |
| 5,552,987 | 9/1996 | Barger et al. | 701/14 |
| 5,579,519 | 11/1996 | Pelletier | 717/5 |
| 5,608,627 | 3/1997 | Lecomte et al. | 701/3 |
| 5,642,284 | 6/1997 | Parupalli et al. | 701/30 |
| 5,778,381 | 7/1998 | Sandifer | 707/104 |
| 5,798,474 | 11/1999 | Sandifer | 707/104 |
| 5,917,408 | 6/1999 | Cardillo et al. | 364/424.03 |

*Primary Examiner*—Michael J. Carone
*Assistant Examiner*—Fredrick T. French, III
*Attorney, Agent, or Firm*—Jeffrey W. Astle

[57] ABSTRACT

The system provides engine maintenance information automatically from fault code data received from an onboard engine performance monitoring computer. The maintenance information is provided by an HTML repair guide electronically called by the control system using the fault code as part of the page address in the HTML guide. The control system automatically ensures that all fault codes are responded to, i.e. that maintenance personnel carry out the appropriate maintenance actions in response to each and every fault code, with a view to improve quality assurance of maintenance. Maintenance actions of maintenance personnel are automatically for the purposes of validating and/or generating warranty claim applications. The system also has a warranty claim report generator for processing aircraft maintenance action log data. The generator has a warranty action discriminator for reading the action log data and outputting data representing possible warranty covered actions, and a warranty action validator receiving the possible warranty covered actions data and engine performance data for outputting data representing warranty claim actions. The warranty claim actions data are processed to produce warranty claim report output data.

11 Claims, 3 Drawing Sheets

MAINTENANCE AND WARRANTY CONTROL SYSTEM FOR AIRCRAFT

CROSS REFERENCE TO RELATED APPLICATION

This application is a continuation application based on U.S. application Ser. No. 08/893,672, filed Jul. 11, 1997, now U.S. Pat. No. 6,003,808 issued Dec. 21, 1999 in the name of the same inventors which file should be incorporated herein.

FIELD OF THE INVENTION

The present invention relates to a maintenance control system for fixed wing and rotor aircraft to assist aircraft engine maintenance personnel in carrying out repairs and routine maintenance. The invention relates further to an automatic warranty report generating system for aircraft.

BACKGROUND OF THE INVENTION

In the aircraft industry, onboard engine performance monitoring equipment is used to record engine and aircraft performance data and to detect defects or the need for routine engine maintenance. The onboard systems are used to generate "fault codes" representing symptoms of engine and/or performance problems. Ground maintenance personnel use the fault codes to direct maintenance efforts using maintenance manuals that provide suggestions for appropriate actions or responses to each fault code. The maintenance log is updated by ground personnel after carrying out the appropriate actions. If a part is replaced, and the part is under warranty, a form is filled out to request compensation from the engine manufacturer for the part and possibly the cost of the labor. The warranty claim is processed by the manufacturer of the engine. Data on the history of the engine repair as well as hours logged are consulted to assess the claim.

The prior art maintenance control systems are awkward and inefficient to use, in that the fault codes, maintenance manuals and warranty claim application systems are not integrated, and the maintenance personnel is responsible for transferring information between the various systems. The warranty claim validation process, as known in the art, is also hampered by an overburden of unacceptable or improperly substantiated claims, and by a lack of the engine performance data in the warranty claim application to be able to assess properly the claim.

SUMMARY OF THE INVENTION

It is an object of the present invention to provide a maintenance control system for use with aircraft engines which provides engine maintenance information automatically from fault code data received from an onboard engine performance monitoring computer. According to another object of the invention, the maintenance information may be provided by a multi-media repair guide electronically linked to the control system. The multi-media repair guide system may comprise the actual engine or aircraft maintenance electronic manual (on CD-ROM or the like) to avoid duplication and the need for synchronization of the same information in this integrated scheme. The maintenance CD-ROM guide can be of multi-media type that includes text, graphics, audio video clips and should provide hot-links to different related sections to allow direct access to the needed information.

It is a further object of the present invention to provide a maintenance control system for use with aircraft engines which automatically ensures that all fault codes are responded to, i.e. that maintenance personnel carry out the appropriate maintenance actions in response to each and every fault code, with a view to improve quality assurance of maintenance.

It is another object of the present invention to provide a maintenance control system for use with aircraft engines which automatically records maintenance actions of maintenance personnel for the purposes of validating and/or generating warranty claim applications.

It is yet a further object of the present invention to provide a maintenance control system for use with aircraft engines which automatically generates a warranty claim application based on data available from maintenance records.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

Figure 1:
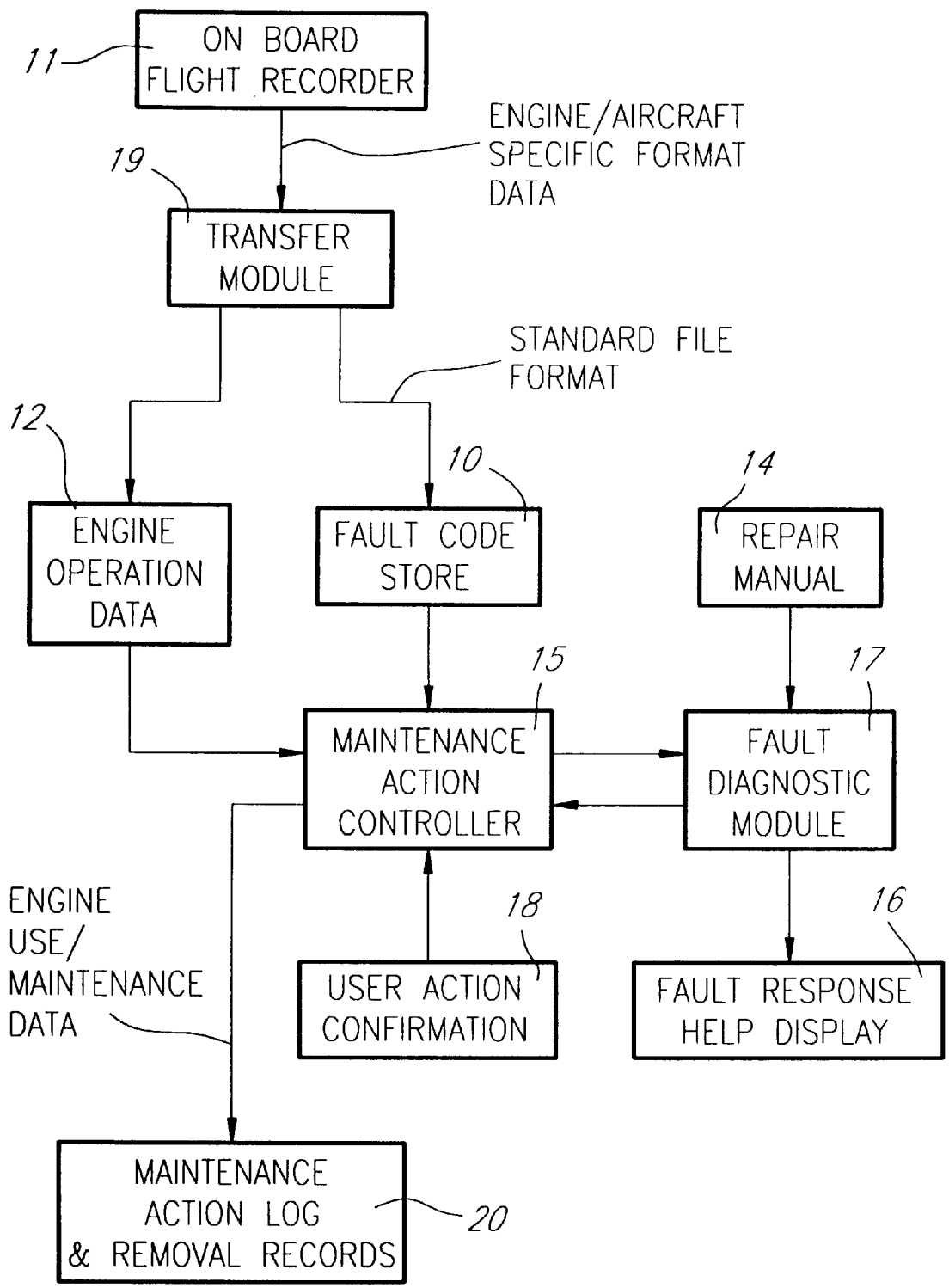
FIG. 1 is a schematic block diagram of the maintenance control system for use with aircraft engines according to the preferred embodiment including user maintenance action confirmation and automatic control of fault code diagnostic and response.

As illustrated in FIG. 1, the maintenance control system has a fault code store 10 and an engine operation data store 12. The data stores 10 and 12 are obtained from onboard recorders as is known in the art. The fault code store 10 contains all of the fault codes accumulated since the last maintenance servicing of the aircraft engine. The engine operation data 12 contains recorded values from the operation of the engine and aircraft as recorded by the onboard data recorder since the last servicing of the engine, and the engine operation data may also contain historical data concerning past engine use and maintenance.

At the onset of maintenance using the ground-based system according to the invention, data from the aircraft data recorder 11 is compiled into a standard format data file by a transfer module 19 for use with the present invention. The use of the standard file format allows different engine/aircraft models to be handled in the same system. The conversion is done by the download utility that can be engine specific as well as by the recorder itself. The fault code store 10 and the engine operation data 12 may be integrated into the same data store as part of the same database. The exact inventory of all parts to be tracked in an engine is stored in the database. The database is also managed to reflect changes made in the parts installed in the engine so that monitoring of such tracked parts can be carried out even if parts are switched between engines. The database configuration will allow the calculation of the operational data (hours, cycles) of the related parts and components from the aircraft/engine data. The modules in the system are linked with the database via ODBC (Open DataBase Connectivity) so that different types of databases can be used without modifying the software. The maintenance action controller 15 reads the fault codes from the fault code store 10. The maintenance action controller 15 may review all fault codes in order to determine the most efficient order in which the fault codes are to be handled. Additionally, the maintenance action controller 15 may allow the user to view a list of the fault codes and select the fault codes to be acted on in a sequence or priority determined by the user. The maintenance action controller 15 ensures that each and every fault code is acted on or dispositioned.

The controller 15 in the preferred embodiment reads the data stored in the engine operation data store 12 to determine if additional fault codes representing routine checks and inspections or replacements should be created. Such fault codes are, in a way, maintenance flags generated by the ground system and by not the onboard systems. Such fault codes can be added to the store of fault codes 10 by controller 15.

For each fault code to be acted on, the maintenance action controller 15 outputs a fault code value to the fault diagnostic module 17. The diagnostic module 17 obtains the appropriate diagnostic and response information from a repair maintenance manual store 14 for the particular engine, and outputs information concerning the diagnosis of the fault and the appropriate response in a fault response help display 16. In the preferred embodiment, the repair maintenance manual store 14 and the fault response help display 16 are integrated into the same device, namely the repair maintenance manual is provided on a CD-ROM in HTML/SGML format, and the display 16 is provided by an HTML/SGML browser program running on a general purpose personal computer. Of course, other forms of electronic media and browsable file format may be suitable. The use of HTML allows the maintenance/repair manual to be accessed via the Intranet or Internet environment, if the access speed is adequate. The fault diagnostic module 17 may initiate the execution of the CD-ROM browser by giving it a parameter for the specified page address for the fault code. This may be done by appending the appropriate prefix and suffix code to the actual fault code or the fault code may be translated using a table into a help page address for the HTML format repair manual 14 and the CD-ROM browser must allow passing of the CD-ROM index (anchor name) as an argument in the calling procedure. The prefix and suffix conventions and the browser names/locations can be different from one engine model to another. They will be defined in a setup option of the Fault Diagnostic Module (FMD). For the same engine model the prefix and suffix can be different from one range of fault codes to another range. The use of conventions and setup options allow adding new fault code diagnostics in the repair manual without changing the FMD software itself. It also allows the FMD to handle different engine/aircraft models in the same system.

A particular fault code may require selection of one out of a number of possible responses. The user therefore has a certain number of options in browsing the repair manual help text in order to locate the appropriate response description for the fault code. For example, the user may be requested to obtain further data, measure a particular parameter or test a particular component on the engine in order to confirm whether a particular action is appropriate. In the preferred embodiment, each action undertaken by the user is confirmed to the maintenance action controller 15, and the user inputs confirmation of his action using interface 18. The fault diagnostic module 17 reports back to the maintenance action controller 15 that the fault code has been addressed along with data on all of the users confirmed actions in response to the fault code. After carrying out the diagnostic instructions related to a fault code or a combination of fault codes, the user returns to controller 15 and confirms that the fault code has been acted upon by selecting the "DONE" button on the GUI. The controller will request the user to log the maintenance actions. A tailored list of standard maintenance actions (tasks) in response to the particular fault code is used to facilitate the logging. The user, however, can enter his own action if it is not on the list. If the maintenance action involves removing/replacing a part, the controller will request for additional information:

reason for removal (also can be selected from a standard list for the particular fault code);

event that triggered the removal (such as in-flight shut down (I.F.S.D.) induced or scheduled event);

disposition of the part, such as discard, retained pending warranty disposition, modified, inventory, or repair If it is sent to a repair shop, the shipping destination is also requested.

The controller will then generate a removal record that also contains the operational data (cycles/hours flown) related to the part and the engine. This record will be stored in the database for further use in the tracking and warranty process. It may optionally be printed out on a form or traveler to physically accompany the part. Controller 15 ensures that all fault codes are responded to before confirming that the ground-based maintenance is complete.

When all of the fault codes have been responded to, the maintenance of the engine is complete. The maintenance action controller 15 outputs engine use and maintenance data to a maintenance action log 20. The Maintenance Action Log compiles relevant data, including the date stamp, task number and/or description, hours spent, reason for the action and/or fault code(s), operational data of the engine when the action is done. The maintenance action log 20 provides a complete picture of the status of the maintenance of the engine including what actions maintenance personnel undertook in response to the fault codes generated by the onboard engine monitoring systems.

Figure 2:
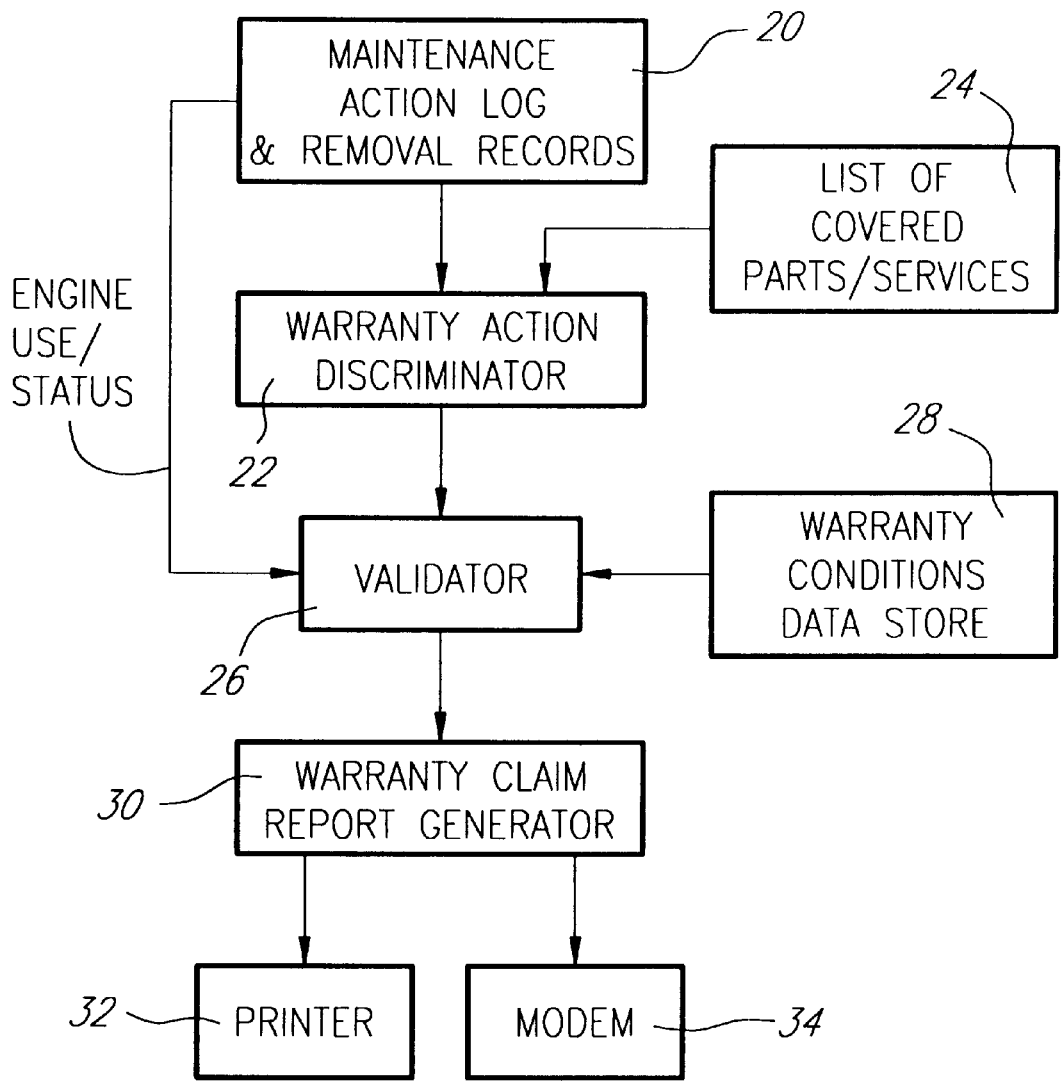
FIG. 2 is a schematic block diagram of the maintenance control system for use with aircraft engines according to the preferred embodiment including automatic warranty claim application generation.
Figure 3:
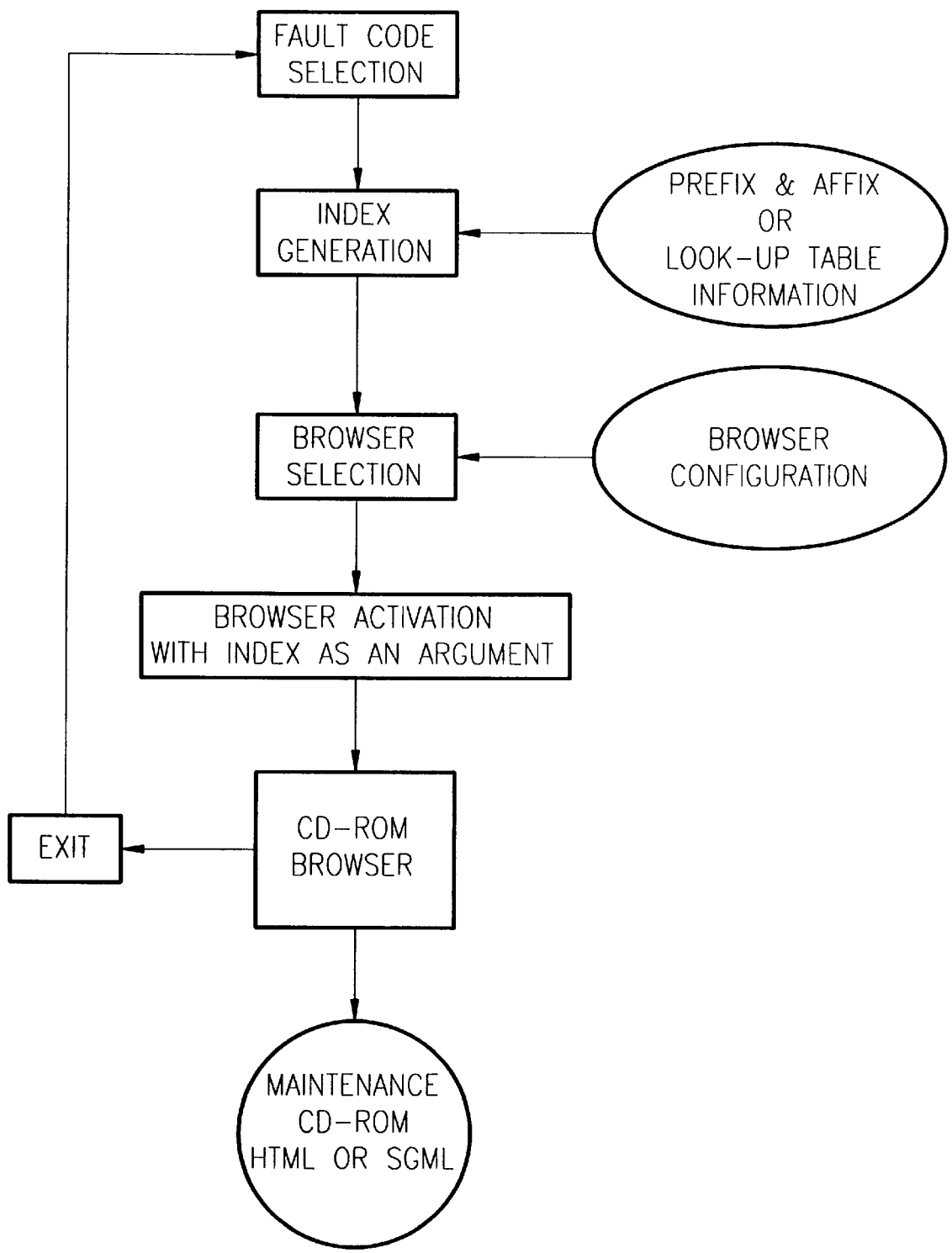
FIG. 3 is a flow chart of the maintenance manual fault code analysis and display method according to the preferred embodiment.

With reference to FIG. 2, the automatic warranty claim report generator will be described. A warranty action discriminator 22 reads the list of all maintenance actions from the maintenance action log 20 or responds to a user selection from the list. The discriminator 22 checks each action against a list of actions potentially covered by the engine's warranty policy contained in a data store 24 to compile a list of warranty actions to be validated. For each engine model, a list of warranty parts/services are defined in the database. A warranty action may be an engine part which is replaced under warranty, or the warranty action may be a service action not involving the replacement of a part.

A validator 26 analyses each of the warranty actions to determine whether the warranty action is properly covered by the terms of the warranty policy or contract for the particular engine. The validator 26 determines what conditions must be met for a warranty action to be covered by the warranty from an warranty conditions data store 28. The "Warranty Condition" data store will contain at least the information on maximum allowable operational hours/cycles and maximum allowable age of the part. For each of the conditions which needs to be met, the validator 26 reads the necessary data from the maintenance action log 20. The validator 26 also looks at the status of related fault codes to see if all were properly acted upon. If the validator determines that the maintenance action is covered by the warranty, then the validator 26 outputs the maintenance action as a valid warranty action to a warranty claim report generator 30. If additional information is needed, the validator will ask the user for input. For those maintenance actions that are unacceptable to the validator, the user still has the option to override the validator and include such actions in the claim. A remark will be tagged for further evaluation by the warranty administrators. The printed form of the warranty claim preferably resembles a standard "Request for Service Allowance" form.

The warranty claim report generator 30 compiles all of the valid warranty actions to produce a single warranty claim and then to generate a warranty claim application report. The application report may be output as a hard copy to printer 32, and it may be transmitted by telecommunication means such as modem 34 directly to the aircraft engine manufacture or servicing agent for the purposes of processing the warranty claim. From the date stamp and fault codes, data including performance data logged at the time of the fault can be reviewed for any indication of activity outside warranty conditions, and the agent can assess the validity of the claim. A hard copy report may be sent by telecopier or other electronic means for immediate processing. The report may include an identification which allows the claim processor to know that the claim has been automatically validated by the validator 26.

We claim:

1. In an aircraft maintenance information system, a method of displaying maintenance information comprising:

reading a fault code from a store of fault codes relating to an aircraft under repair or maintenance;

automatically generating a maintenance manual HTML index using said fault code and one of a look-up table and by appending an affix to a character representation of said fault code;

displaying information specific to said fault code using said index.

2. An aircraft maintenance control system, comprising:

a data store of engine performance data including engine fault code data, said engine performance data being obtained from an aircraft onboard engine performance monitoring and recording system;

a maintenance and repair information display system including a store of HTML maintenance and repair documentation having entries corresponding to fault codes and an HTML browser for displaying maintenance information related to a fault code in response to an address relating to said fault code; and a maintenance action controller connected to said data store for generating said address using said fault code retrieved from said data store by one of using a look-up table and appending an affix to a character representation of said fault code, and causing said information display system to display maintenance information for at least some fault codes in said fault code data.

3. The control system as claimed in claim 2, further comprising user action confirmation input unit recording, in a maintenance action log, data representing an action taken by a user in response to said fault codes.

4. The control system as claimed in claim 3, wherein said controller comprises means for prompting said user to enter said action taken for all said fault codes prior to generating said completion output signal.

5. The control system as claimed in claim 3, further comprising a warranty action discriminator reading said action log and outputting data representing possible warranty covered actions.

6. The control system as claimed in claim 5, further comprising a warranty action validator receiving said possible warranty covered actions data and said engine performance data, and outputting data representing warranty claim actions.

7. The control system as claimed in claim 6, further comprising a warranty claim report generator processing said warranty claim actions data and producing a warranty claim report output.

8. The control system as claimed in claim 3, further comprising a warranty action discriminator reading said action log and outputting data representing possible warranty covered actions.

9. The control system as claimed in claim 8, further comprising a warranty action validator receiving said possible warranty covered actions data and said engine performance data, and outputting data representing warranty claim actions.

10. The control system as claimed in claim 9, further comprising a warranty claim report generator processing said warranty claim actions data and producing a warranty claim report output.

11. An aircraft maintenance control system, comprising:

a data store of engine performance data including engine fault code data, said engine performance data being obtained from an aircraft onboard engine performance monitoring and recording system;

a maintenance and repair information display system for displaying maintenance information in response to fault codes;

a maintenance action controller connected to said data store for causing said information display system to display maintenance information for at least some fault codes in said fault code data; and a user action confirmation input unit recording, in a maintenance action log, data representing an action taken by a user in response to said fault codes, wherein said controller comprises means for prompting said user to enter said action taken for all said fault codes prior to generating a completion output signal.

* * * * *